(12) United States Patent
Heap et al.

(10) Patent No.: US 9,387,850 B2
(45) Date of Patent: Jul. 12, 2016

(54) METHOD AND APPARATUS FOR CONTROLLING A MULTI-MODE POWERTRAIN SYSTEM

(71) Applicant: GM GLOBAL TECHNOLOGY OPERATIONS LLC, Detroit, MI (US)

(72) Inventors: Anthony H. Heap, Ann Arbor, MI (US); Wilfried Brunssen, Ypsilanti, MI (US); Poh Fong Chin, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 310 days.

(21) Appl. No.: 13/900,602

(22) Filed: May 23, 2013

(65) Prior Publication Data
US 2014/0349807 A1 Nov. 27, 2014

(51) Int. Cl.
*B60W 10/06* (2006.01)
*B60W 20/00* (2016.01)
*B60K 6/445* (2007.10)

(52) U.S. Cl.
CPC ............... *B60W 20/10* (2013.01); *B60K 6/445* (2013.01); *B60W 10/06* (2013.01); *B60W 20/40* (2013.01); *B60W 2710/0605* (2013.01); *B60W 2710/0683* (2013.01); *B60Y 2300/525* (2013.01); *Y02T 10/6239* (2013.01); *Y10S 903/902* (2013.01); *Y10T 477/23* (2015.01)

(58) Field of Classification Search
None
See application file for complete search history.

(56) References Cited

U.S. PATENT DOCUMENTS

| | | | | |
|---|---|---|---|---|
| 5,725,064 | A | * | 3/1998 | Ibaraki .................. B60K 6/485 180/65.26 |
| 7,606,652 | B2 | | 10/2009 | Kaiser et al. |
| 8,086,390 | B2 | | 12/2011 | Whitney et al. |
| 8,214,127 | B2 | | 7/2012 | Whitney et al. |
| 2006/0021602 | A1 | * | 2/2006 | Liller ....................... B60K 6/48 123/491 |

\* cited by examiner

*Primary Examiner* — Colby M Hansen

(57) ABSTRACT

A multi-mode powertrain system includes a transmission configured to transfer torque among an internal combustion engine, torque machines and an output member. A method for controlling the powertrain system includes operating the multi-mode powertrain system to execute an engine intake manifold pump down mode, and aborting the engine intake manifold pump down mode and fueling the engine, wherein aborting is based upon intake manifold pressure and system constraints.

15 Claims, 6 Drawing Sheets

METHOD AND APPARATUS FOR CONTROLLING A MULTI-MODE POWERTRAIN SYSTEM

TECHNICAL FIELD

This disclosure is related to dynamic system controls associated with multi-mode powertrain systems employing multiple torque-generative devices.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A multi-mode powertrain system includes a transmission configured to transfer torque among an internal combustion engine, torque machines and an output member. A method for controlling the powertrain system includes operating the multi-mode powertrain system to execute an engine intake manifold pump down mode, and aborting the engine intake manifold pump down mode and fueling the engine, wherein aborting is based upon intake manifold pressure and system constraints.

BRIEF DESCRIPTION OF THE DRAWINGS

One or more embodiments will now be described, by way of example, with reference to the accompanying drawings, in which:

FIG. 2-1 illustrates a deceleration fuel cutoff (dFCO) pumping loss reduction (DPLR) mode enablement process for controlling a multi-mode powertrain system employing an engine that is configured to operate in the DPLR mode, in accordance with the disclosure;

FIG. 2-2 illustrates a DPLR mode exit process associated with a DPLR mode enablement process, in accordance with the disclosure;

FIG. 2-3 illustrates a pump down abort and refuel logic associated with a DPLR mode exit process, in accordance with the disclosure;

FIG. 3 illustrates operation of a multi-mode powertrain system executing transitions in response to a dFCO request, a DPLR mode request and a DPLR mode exit request, in accordance with the disclosure; and FIGS. 4-1, 4-2, and 4-3 illustrates operation of multi-mode powertrain system executing an embodiment of a DPLR mode exit process in response to an accelerator torque request that includes a regular or moderate accelerator tip-in command, a wide-open throttle accelerator tip-in command, and a gentle accelerator tip-in command, in accordance with the disclosure.

DETAILED DESCRIPTION

Figure 1:
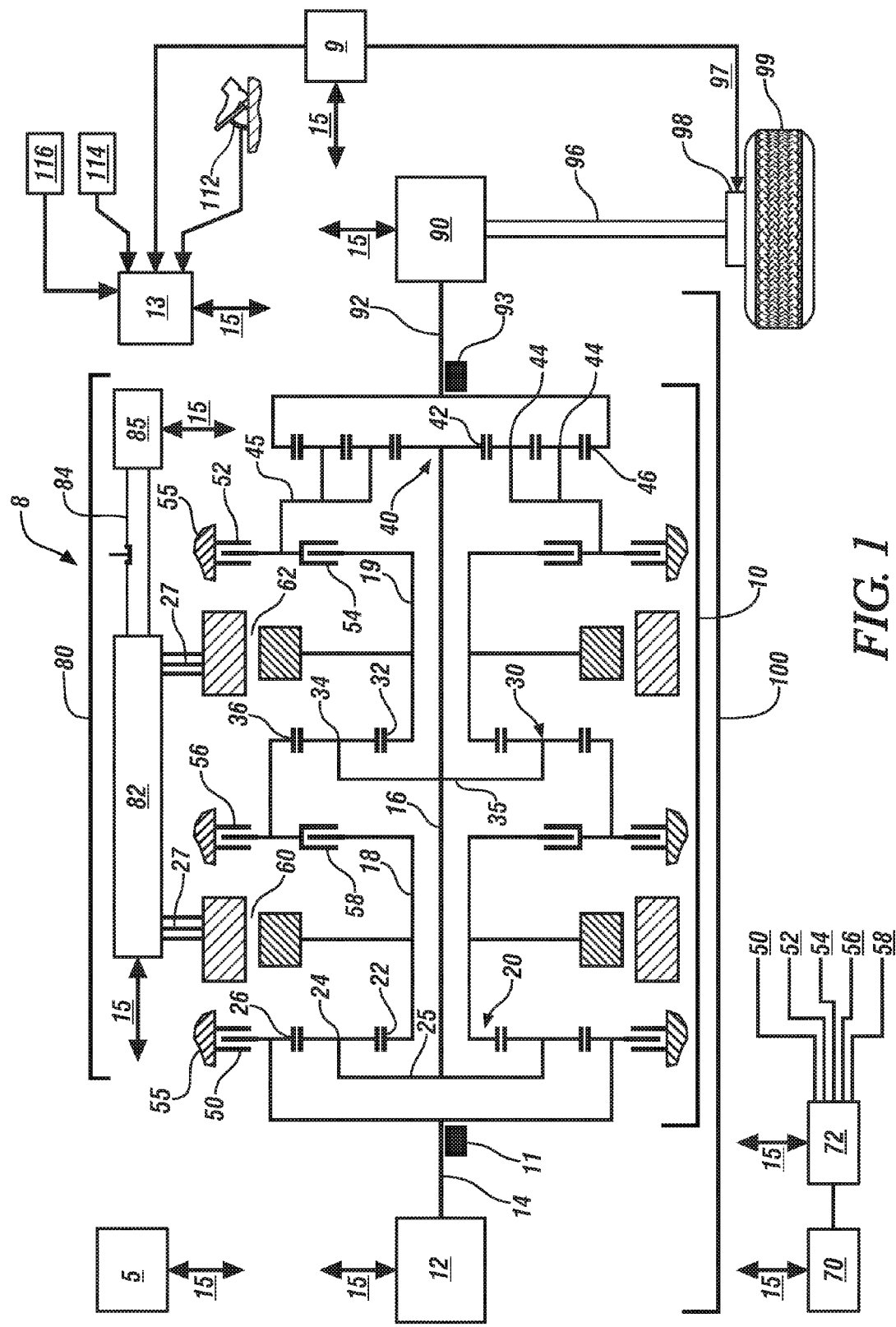
FIG. 1 illustrates a vehicle including a multi-mode powertrain system including an internal combustion engine, transmission and a driveline, in accordance with the disclosure.

Referring now to the drawings, wherein the showings are for the purpose of illustrating certain exemplary embodiments only and not for the purpose of limiting the same, FIG. 1 depicts a non-limiting embodiment of a vehicle 8 including a multi-mode powertrain system 100 configured to transfer tractive torque to one or more ground wheels 99 for propulsion. The multi-mode powertrain system 100 includes an internal combustion engine (engine) 12, a multi-mode transmission (transmission) 10, a high-voltage electrical system 80, a driveline 90, and a controller 5. The transmission 10 mechanically couples to torque generators including the engine 12 and first and second torque machines 60 and 62, respectively, and is configured to transfer torque between the engine 12, the torque machines 60, 62, and the driveline 90. As illustrated, the first and second torque machines 60, 62 are electric motor/generators. The driveline 90 includes a differential system that couples via an axle 96 to one or more of the ground wheels 99, and is characterized by a final drive ratio that provides torque multiplication to the driven ground wheels. In one embodiment, the driveline 90 is configured in a rear-wheel drive arrangement. Alternatively, the driveline 90 can be configured to operate in a front-wheel drive arrangement, an all-wheel drive arrangement, a four-wheel drive arrangement, or another arrangement without limitation.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage electrical bus 84, including voltage and electric current.

The engine 12 may be any suitable combustion device, and preferably includes a multi-cylinder internal combustion engine selectively operative in several states to transfer torque to the transmission 10 via an input member 14, and can be either a spark-ignition or a compression-ignition engine. The engine 12 preferably includes an electronically controllable throttle device for metering intake air flow and a manifold pressure (MAP) sensor for monitoring intake manifold pressure, which is preferably measured in reference to an absolute pressure. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The exemplary transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50, although one having ordinary skill in the art will recognize the applicability of the present disclosure to alternative transmissions. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, and band clutches. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other methods.

The first and second torque machines 60 and 62 are three-phase AC motor/generator machines, each including a stator, a rotor, and a position sensor, e.g., a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the TPIM 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 rotatably connects to the driveline 90 to provide output power to the driveline 90 that is transferred to one or a plurality of the ground wheels 99 via differential gearing or another suitable device in this embodiment. The output power at the output member 92 is characterized in terms of an output rotational speed and an output torque. A transmission output speed sensor 93 monitors rotational speed and rotational direction of the output member 92. Each of the ground wheels 99 is preferably equipped with a sensor configured to monitor wheel speed to determine vehicle speed, and absolute and relative wheel speeds for braking control, traction control, and vehicle acceleration management. Each ground wheel 99 is preferably equipped with a controllable wheel brake 98 that can be any suitable configuration, e.g., a disc-brake configuration. Each wheel brake 98 applies a mechanical brake torque 97 for resisting rotation of the corresponding ground wheel 99, wherein a brake controller 9 commands the mechanical brake torque 97 in response to an operator-commanded braking force 113. The mechanical brake torque 97 can directly correspond to the operator-commanded braking force 113. Alternatively, the mechanical brake torque 97 can be responsive to the operator-commanded braking force 113 taking into account an electrical brake torque induced in the driveline 90 through the output member 92 due to electrically-induced reactive torque from one or both of the first and second torque machines 60, 62. The electrically-induced reactive torque from one or both of the first and second torque machines 60, 62 may be associated with regenerative braking.

The input torque from the engine 12 and the motor torques from the first and second torque machines 60, 62 are generated as a result of energy conversion from fuel or electrical potential stored in the battery 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or electric power regeneration functionality to meet the motor torque commands. The power inverters include complementary three-phase power electronics devices, and each includes a plurality of insulated gate bipolar transistors (IGBTs) for converting DC power from the battery 85 to AC power for powering respective ones of the first and second torque machines 60 and 62, by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85. The battery 85 is characterized in terms of a state of charge (SOC), and powertrain system operation comprehends maintaining the SOC of the battery 85 within a predetermined range.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. The controller 5 signally connects to the brake controller 9 via communications link 15 for coordinating operational control of vehicle braking as described herein. A user interface 13 is preferably signally connected to a plurality of devices through which a vehicle operator directs and commands operation of the powertrain system, including commanding an output torque request and selecting a transmission range. A vehicle operator directs and commands operation of the powertrain system, including an operator-commanded acceleration torque 112 input from an accelerator pedal, the operator-commanded braking force 113 input from a brake pedal, an operator-commanded transmission range 114 input from a range selector (PRNDL), and an operator-commanded vehicle speed 116 input from a cruise control system. The operator-commanded acceleration torque 112 input from the accelerator pedal can range from a 0% level indicating no operator input to the accelerator pedal to a 100% level indicating a maximum operator input to the accelerator pedal, which is an operator request for maximum output torque from the powertrain system often referred to as a wide-open throttle (WOT) maneuver. The operator-commanded braking force 113 can range from a 0% level indicating no operator input to the brake pedal to a 100% level indicating an operator input to the brake pedal commanding a braking torque up to a maximum achievable braking torque. The transmission range selector preferably provides for operator-selectable transmission ranges associated with effecting vehicle propulsion, e.g., R, D, and L, and operator-selectable transmission ranges associated with decoupling the torque generators including the engine 12 and first and second torque machines 60 and 62 from the output member 92, e.g., P and N. The transmission range selector may provide for a discrete number of operator-selectable transmission ranges indicating an operator-intended direction of travel of the vehicle of either a forward or a reverse direction, thus indicating a preferred rotational direction of the output member 92. It is appreciated that the vehicle may still move in a direction other than the indicated direction of operator-intended motion due to rollback caused by location of a vehicle, e.g., on a hill. The operator-selectable positions of a transmission range selector can correspond directly to individual transmission ranges described with reference to Table 1, or may correspond to subsets of the transmission ranges described with reference to Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, and 100 milliseconds during ongoing engine and vehicle operation. Alternatively, routines may be executed in response to occurrence of an event.

The multi-mode powertrain 100 is configured to operate in one of a plurality of powertrain states, including a plurality of transmission ranges and engine states to generate and transfer torque to the driveline 90. The transmission ranges include a plurality of neutral (neutral), fixed gear (Gear #), variable mode (EVT Mode #), electric vehicle (EV #) and transitional (EV Transitional Range# and Pseudo-gear #) ranges that are achieved by selectively activating the clutches C1 50, C2 52, C3 54, C4 56, and C5 58. The pseudo-gear ranges are variable mode transmission ranges in which magnitude of torque output from the transmission to the driveline correlates to magnitude of the engine input torque, taking into account torque losses associated with torque-consuming components on the input member 14. The pseudo-gear range(s) can be employed as intermediate transmission ranges during shifts between EVT Mode ranges, and can also be employed as steady-state transmission operating states.

The engine states include an ON state and an OFF state. The engine is considered to be in the ON state when the engine is spinning. The engine ON state may include an all-cylinder state (ALL) wherein all cylinders are fueled and firing to generate torque, and a cylinder-deactivation state (DEAC) wherein a portion of the cylinders are fueled and firing to generate torque and the remaining cylinders are unfueled, not firing, and not generating torque. The engine ON state further includes a fuel cutoff (FCO) state, wherein the engine is spinning with all of the cylinders unfueled and not firing, and thus not generating torque. When the engine is in the OFF state, it is not spinning. In one embodiment, operating with the engine in the OFF state can be accomplished by grounding rotation of the input member to the transmission case using a clutch or similar device. By way of example, the powertrain system 100 shown with reference to FIG. 1 can operate with the engine 12 in the OFF state, i.e., not spinning by activating clutch C5 50 to ground rotation of the input member 14 to the transmission case 55 with speeds of the first and second torque machines 60, 62 controlled to achieve an output speed and output torque that are responsive to the output torque request. Alternatively or in addition, operating with the engine in the OFF state can be accomplished by controlling rotational speeds of the torque machines to achieve an input speed that is zero and an output speed and output torque that are responsive to the output torque request. The output torque request includes a positive output torque request leading to vehicle acceleration and/or steady-state cruising operation.

When the engine operates in the FCO state, the engine is spinning but is unfueled and not firing. The engine can operate in the FCO state in response to an operator command for vehicle deceleration, such as occurs when an operator lifts their foot from the accelerator pedal and allows the vehicle to coast, referred to as a deceleration fuel cutoff state (dFCO). The engine can be commanded to operate in the FCO state under other non-deceleration operating conditions. When operating in the dFCO state, the engine continues to spin, thus drawing in and compressing air in the cylinders, referred to as engine pumping. There is negative torque associated with engine pumping, referred to as pumping loss, which can be employed for vehicle braking under certain conditions but is otherwise undesirable. Pumping loss may be reduced or minimized in specific circumstances by adjusting intake manifold pressure, including increasing the intake manifold pressure towards ambient pressure by opening the throttle and controlling other engine airflow actuators such as cam phasers. A dFCO pumping loss reduction (DPLR) mode can be executed or disabled in specific circumstances in response to an output torque request based upon engine speed and operating conditions of the torque machines and the battery. By way of example, the DPLR mode may be executed in response to an output torque request that includes an operator lifting their foot completely off the accelerator pedal with the vehicle moving when the engine speed is greater than a preset engine speed and the SOC of the battery is greater than a preset SOC. In contrast, the DPLR mode may be disabled in response to an output torque request that includes an operator lifting their foot completely off the accelerator pedal with the vehicle moving when the engine speed is less than a preset engine speed or the SOC of the battery is above than a preset SOC or less than a preset SOC. Other operating conditions for DPLR are associated with capability of the torque machine to achieve a commanded torque request, including but not limited to temperature of the battery, including a battery temperature that is less than a threshold minimum temperature or greater than a threshold maximum temperature, and temperature of the torque machine, including a torque machine temperature that is greater than a threshold maximum temperature.

The powertrain control scheme comprehends, upon entering the DPLR mode, that the engine will eventually be refueled and fired to generate torque for purposes of vehicle propulsion and electric power generation, generally in response to an operator input to the accelerator pedal. A transition to engine operation in a torque-generating mode may include closing the throttle and controlling the other engine airflow actuators such as cam phasers and operating one of the torque machines to spin the engine to pump down intake manifold pressure prior to or in conjunction with the engine refueling to effect such a transition.

Figures 1, 2:
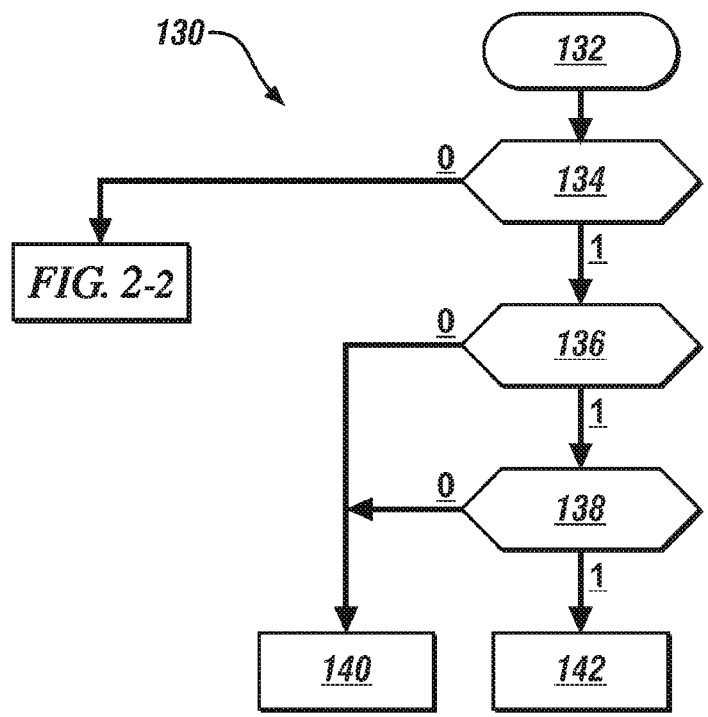
Figure 2:
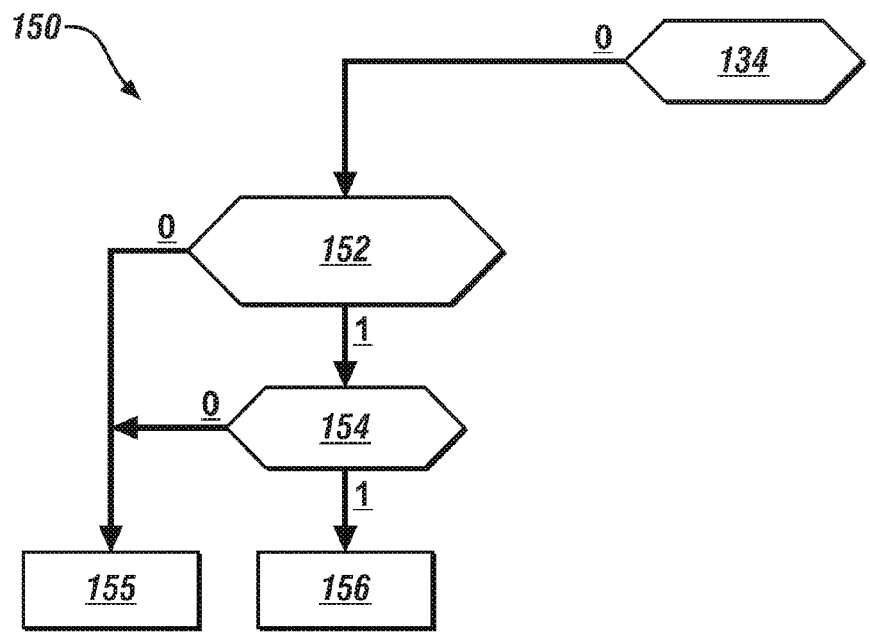

FIG. 2-1 schematically shows a DPLR mode enablement process 130 for controlling a multi-mode powertrain system employing an engine that is configured to operate in the DPLR mode, e.g., the multi-mode powertrain system 100 described with reference to FIG. 1. The DPLR mode enablement process 130 is employed to determine whether to enable operation in the DPLR mode in a manner that balances battery power, battery discharge, and driveability issues related to powertrain responsiveness to an output torque request and driveline feel. Table 1 is provided as a key to FIG. 2-1 wherein the numerically labeled blocks and the corresponding functions are set forth as follows.

TABLE 1

| BLOCK | BLOCK CONTENTS |
|---|---|
| 132 | Monitor operator torque commands |
| 134 | Request dFCO? |
| 136 | DPLR Available? |
| 138 | Request DPLR mode? |
| 140 | Execute dFCO without DPLR |
| 142 | Execute DPLR mode |

The DPLR mode enablement process 130 executes as follows. During ongoing operation of the multi-mode powertrain system, operator torque commands are monitored (132), preferably including an operator-commanded acceleration torque that is preferably input from an accelerator pedal and an operator-commanded braking torque that is preferably input from a brake pedal. Other monitored parameters include the desired engine state that has been determined based on cost optimization.

The operator torque commands, preferably including the operator-commanded acceleration torque input from the accelerator pedal are evaluated to determine whether to request and/or remain operating in the dFCO mode (134). The dFCO mode may be requested (134)(1) in response to various conditions, including when the operator-commanded acceleration torque input from the accelerator pedal indicates that the vehicle operator has lifted their foot from the accelerator pedal, at a low operator input to the accelerator pedal coupled with a high SOC, and other conditions. Operation in the DPLR mode may be disabled when operation in DPLR mode is not available (136)(0). In such circumstances, operation in the dFCO mode may continue, but operation in the DPLR mode is disabled (140). When operation in DPLR mode is available (136)(1), the system determines whether operation in the DPLR mode can be requested (138).

Operating in the DPLR mode may not be requested (138)(0) when conditions are unfavorable. Possible unfavorable conditions include but are not limited to an anticipated imminent engine refueling event, an aggressive braking maneuver, low motor torque capabilities, low battery charge capabilities, and low battery discharge capabilities. When operation in the DPLR mode is requested (138)(1), the powertrain system executes operation in the DPLR mode, including increasing intake manifold pressure towards ambient pressure by opening the throttle and controlling other engine airflow actuators such as cam phasers to minimize pumping losses (142).

FIG. 2-2 schematically shows a DPLR mode exit process 150 that is executed when operating in the dFCO mode is denied or discontinued (134)(0), and is primarily focused upon exiting the DPLR mode subsequent to enabling operation in the DPLR mode. The DPLR mode exit process 150 is employed to determine how to exit operation in the DPLR mode. This includes ensuring that the intake manifold is sufficiently pumped down before refueling occurs. Table 2 is provided as a key to FIG. 2-2 wherein the numerically labeled blocks and the corresponding functions are set forth as follows.

TABLE 2

| BLOCK | BLOCK CONTENTS |
|---|---|
| 134 | Evaluate dFCO request |
| 150 | DPLR mode exit process |
| 152 | Evaluate whether a dFCO exit (refuel event) is requested |
| 154 | Evaluate need to pump down intake manifold |
| 155 | Refuel Engine |
| 156 | Remain in dFCO, execute pump down of intake manifold |

When engine fueling is requested (134)(0) with the system operating in the dFCO mode (152)(1), the need for pumping down the intake manifold is evaluated (154), with such operation described with reference to FIG. 2-3. The pump down mode may be initiated subsequent to operating in the DPLR mode (154)(1) and is maintained (156) until the pump down mode is aborted (154)(0). When the intake manifold is pumped down sufficiently, or aborted for other reasons, engine refueling is executed (155). Executing the pump down mode includes remaining operating in the dFCO mode (156).

Figures 2, 3:
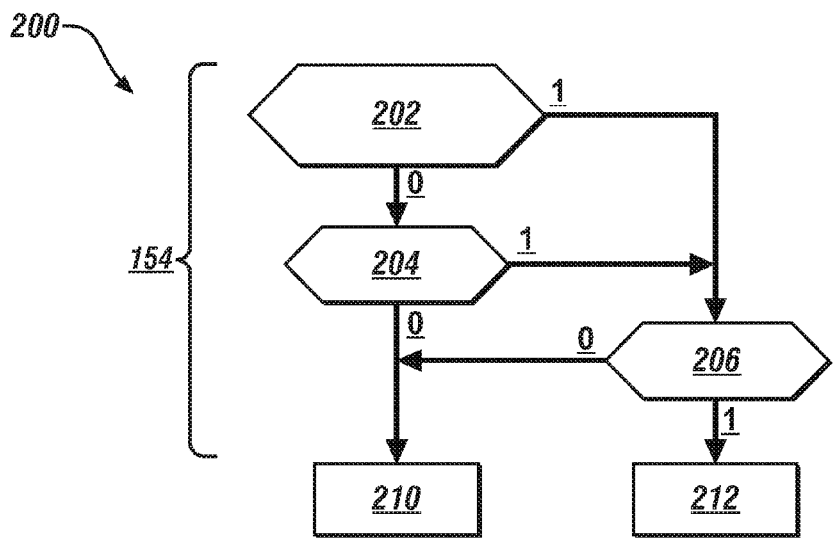
Figure 3:
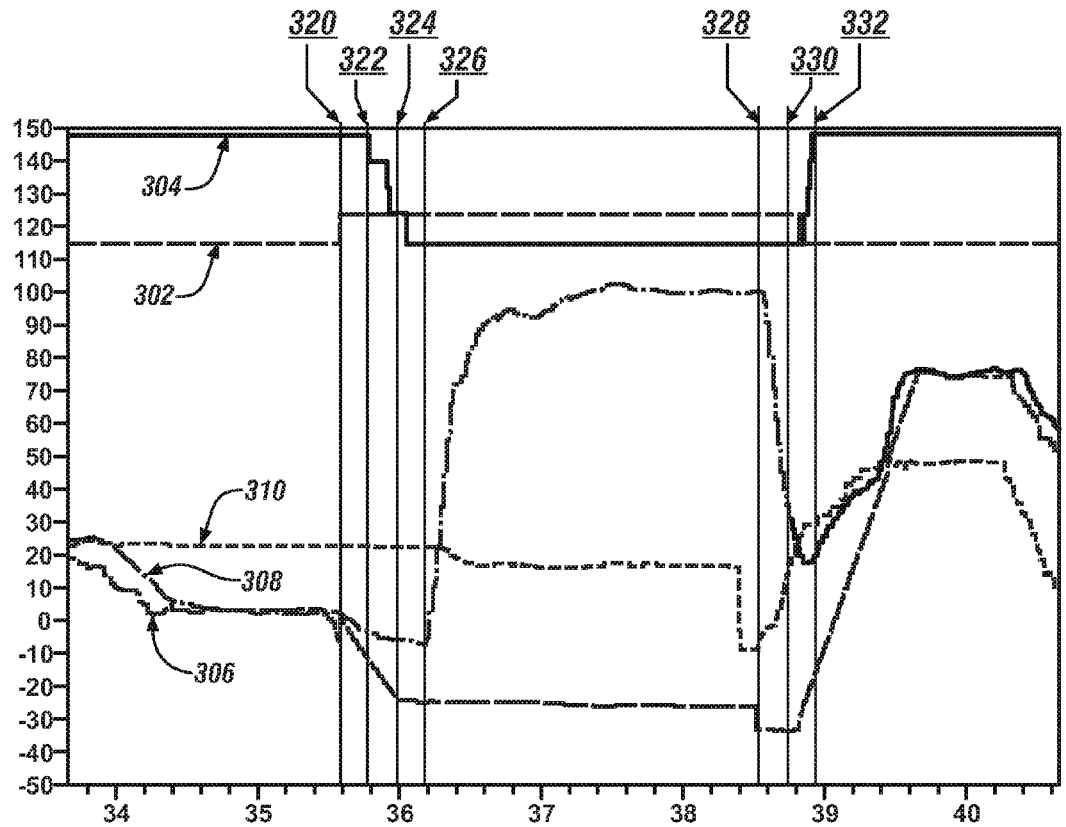

FIG. 2-3 schematically shows the pump down mode abort logic 200, which operates to balance the operator-commanded acceleration torque, battery power, battery discharge and motor capabilities with driveability issues related to powertrain responsiveness to an output torque request and driveline feel. Table 3 is provided as a key to FIG. 2-3 wherein the numerically labeled blocks and the corresponding functions are set forth as follows.

TABLE 3

| BLOCK | BLOCK CONTENTS |
|---|---|
| 202 | Current Airflow Torque too high considering accelerator torque requests? |
| 204 | Current Airflow Torque too high considering torque target? |
| 206 | Evaluate system constraints: Can system constraints be met during pump down? |
| 210 | Abort pump down mode and refuel |
| 212 | Execute intake manifold pump down |

The need for pumping down the intake manifold is evaluated by regularly and periodically monitoring and evaluating powertrain operating parameters including airflow torque (202, 204), accelerator torque request (202), target torque (204) and system constraints including operator-commanded acceleration torque, battery power limits, battery discharge limits and motor capabilities (206). The accelerator torque request corresponds to the operator-commanded acceleration torque 112 input from an accelerator pedal described with reference to FIG. 1. The target torque is a system-generated magnitude torque for operating the engine to meet the driver torque request and system power requirements, such as for generating electric power through one of the torque machines.

The present airflow torque is compared to the accelerator torque request (202), and when considered too high (202)(1), the system constraints are evaluated (206). Otherwise (202)(0), the present airflow torque is compared to the target torque (204), and when considered too high (204)(1), the system constraints are evaluated (206). Otherwise (204)(0), the pump down event is aborted and refueling is initiated (210). Evaluating the system constraints (206) includes evaluating the accelerator torque request, battery power limits, battery discharge limits and motor capabilities to determine whether associated constraints can be met while pumping down the manifold (206)(1) or will be violated (206)(0). When the system constraints can be met during the pump down process, intake manifold pump down executes (212). Aborting the pump down event and initiating refueling (210) leads to engine operation in a torque-generating state. Remaining in the pump down mode might be extended for driveability reasons, but may be aborted for fuel economy considerations including battery state of charge concerns.

Executing the intake manifold pump down process (212) includes decreasing intake manifold pressure by closing the throttle and controlling other engine airflow actuators such as cam phasers while the engine is spinning to decrease intake manifold pressure responsive to the output torque request. This can include commanding operation of one of the torque machines to spin the engine to effect the engine pump down process. The system prepares for refueling by executing the engine pump down process (212). Employing the torque machines to pump down the intake manifold discharges the battery, and is preferably minimized.

Evaluating driveability considerations includes monitoring the accelerator torque request, the engine airflow torque, and an optimum or target engine torque. The engine airflow torque represents the magnitude of torque the engine can generate when fueled and controlled with spark timing at a MBT-spark setting at current airflow conditions. The target engine torque is a measure of a preferred magnitude of engine torque generated in response to the output torque request based upon a balance of the engine torque, the torque outputs from the torque machines and the battery power.

Delaying the engine fueling until the intake manifold pump down process is completed and the engine airflow torque is sufficiently low ensures a smooth transition to operating the powertrain system with the engine fueled and firing. Under conditions when the targeted engine torque is high, eliminating this delay results in a fast torque response with the engine airflow torque being high. Further, this permits relatively slow refueling in response to accelerator torque request that is low. The system constraints evaluation considers whether battery discharge limits and motor limits can be met under current pump down conditions or whether immediate refueling is necessary to meet these limits with minimum consideration for driveability issues or smoothly exiting operation in the DPLR mode.

FIGS. 4-1, 4-2, and 4-3 graphically show operation of multi-mode powertrain system including an engine that is executing an embodiment of the DPLR mode exit process and of the pump down abort and refuel logic described herein, in response to different accelerator torque requests 406, including a moderate or nominally regular accelerator tip-in, a wide-open throttle (WOT) accelerator tip-in, and a gentle tip-in. The depicted data includes various magnitudes of torque on the vertical axis 402, each plotted in relation to time on the horizontal axis 404.

Figures 1, 4:
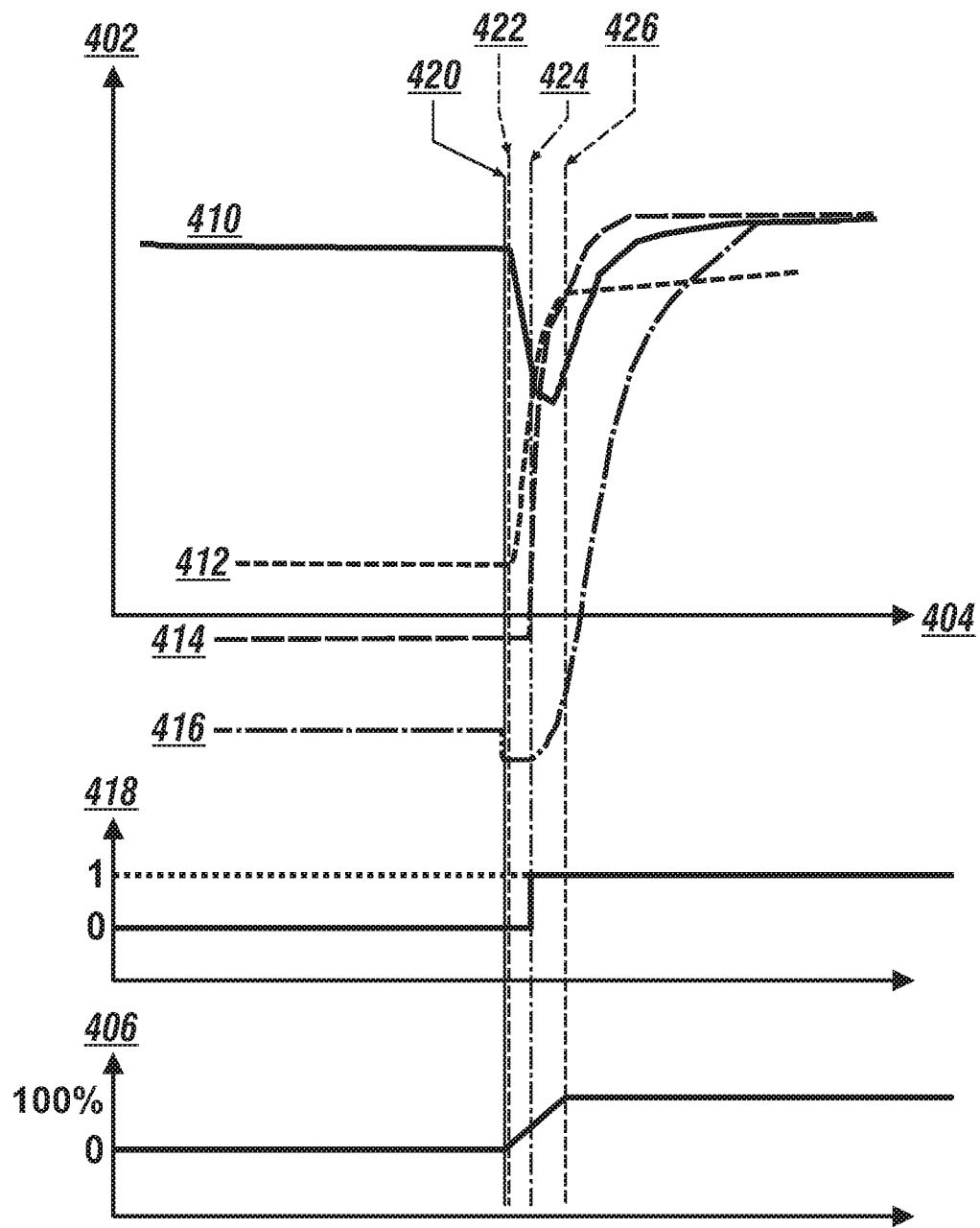
Figures 2, 4:
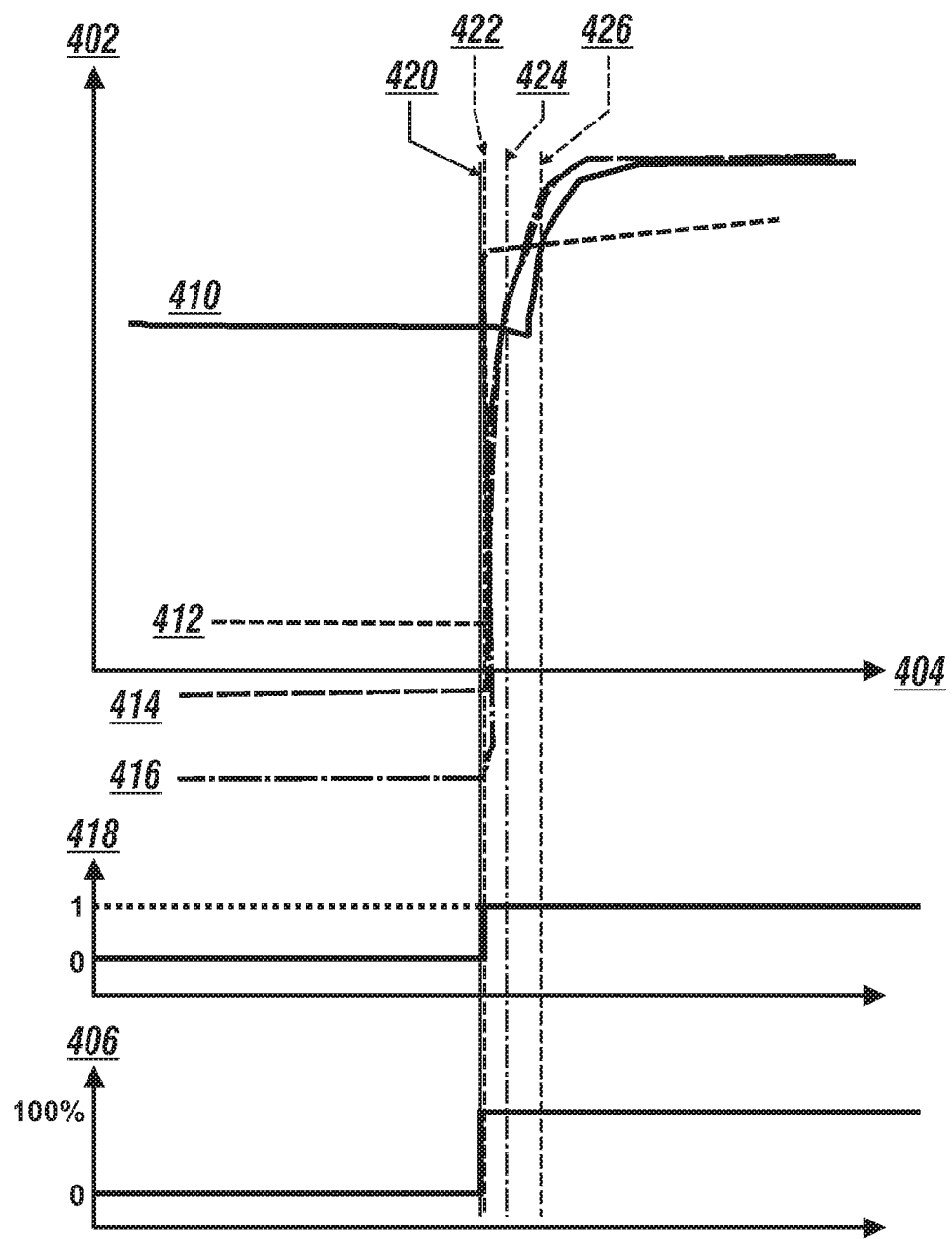
Figures 3, 4:
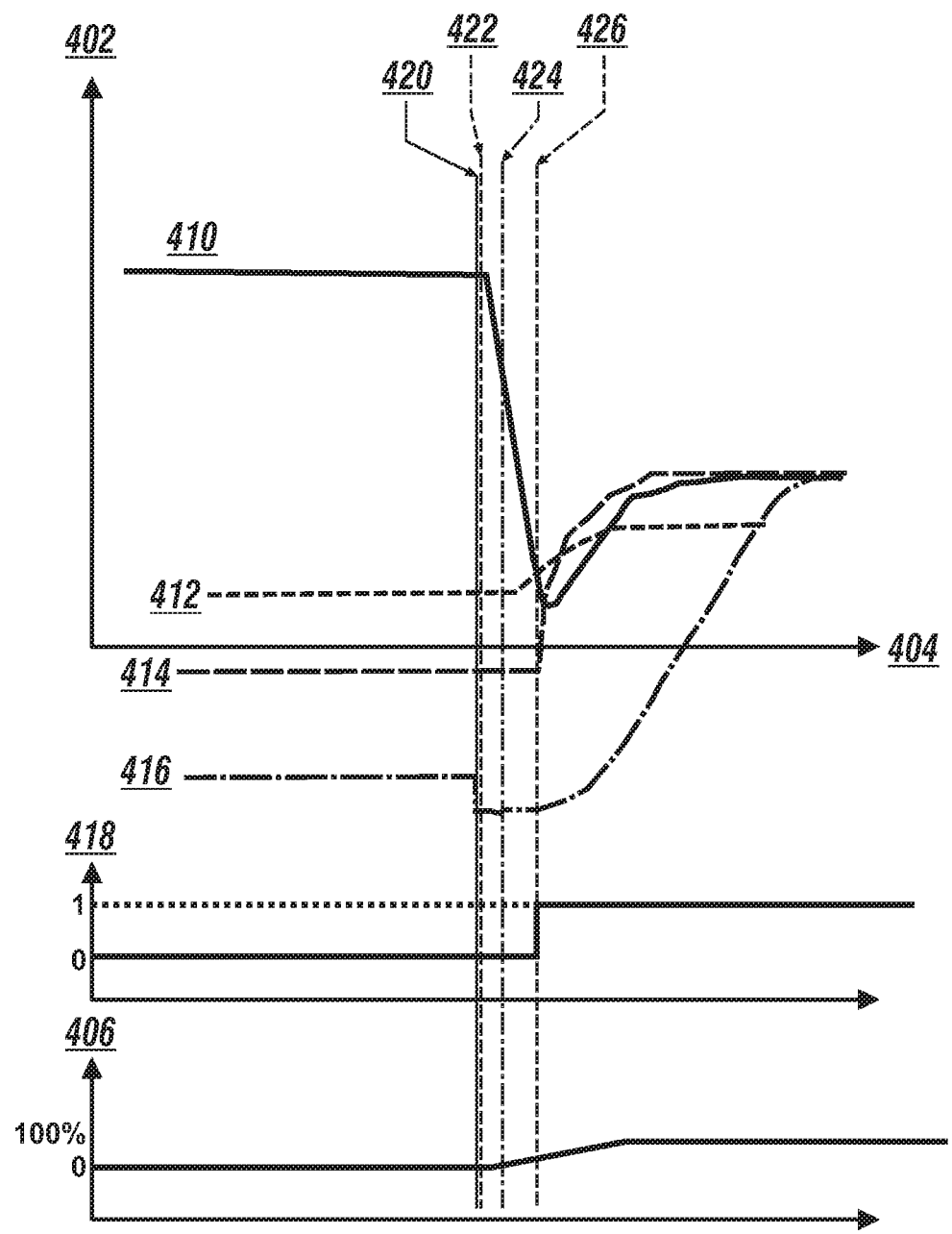

FIG. 4-1 graphically shows operation of the DPLR mode exit process and of the pump down abort and refuel logic in response to an accelerator torque request 406 that includes a regular or moderate accelerator tip-in. Monitored parameters include engine airflow torque 410, an engine torque associated with exiting the pump down mode 412, a predicted engine torque 414 for controlling the airflow torque, and an immediate engine torque 416 for controlling actual torque. At time 420, a regular or moderate accelerator tip-in occurs, prompting a step-decrease in the immediate engine torque request 416 thus initiating execution of intake manifold pump down, and an increase in the engine torque associated with exiting the pump down mode 412. The engine torque request, which is employed to control operation of the engine and is indicated by the predicted engine torque 414 and the immediate engine torque 416, is delayed to permit execution of intake manifold pump down. At time 424, the engine airflow torque 410 matches the engine torque associated with exiting the pump down mode 412, and the predicted engine torque 414 increases, thus commanding initiating engine fueling as indicated by element 418 shifting from state 0 to state 1. The drop of engine airflow torque 410, which is caused by the intake manifold pump down process, has a delayed response.

FIG. 4-2 graphically shows operation of the DPLR mode exit process and of the pump down abort and refuel logic in response to accelerator torque request 406 that includes a wide-open throttle (WOT) accelerator tip-in. At time 420, a wide-open throttle (WOT) accelerator tip-in occurs, prompting an immediate step-increase in the engine torque associated with exiting the pump down mode 412 at time 422 to a value exceeding the engine airflow torque 410. Hence, at time 422 engine fueling is initiated as indicated by element 418 shifting from state 0 to state 1 thus without activating the pump down mode prior to refueling. The delay between times 420 and 422 is merely caused by signal processing. The resulting engine airflow torque 410 has a fast response.

FIG. 4-3 graphically shows operation of the DPLR mode exit process and of the pump down abort and refuel logic in response to an accelerator torque request 406 that includes a gentle accelerator tip-in. At time 420, a gentle accelerator tip-in occurs, prompting a step-decrease in the immediate engine torque request 416 and a moderate increase in the engine torque associated with exiting the pump down mode 412, matching the engine airflow torque 410 after an extended period of time as indicated at time 426, thus commanding initiating the engine fueling as indicated by element 418 shifting from state 0 to state 1. Operation such as is shown in FIG. 3-4 responsive to the accelerator torque request 406 that includes a gentle accelerator tip-in may be precluded from executing in the manner shown if the state of charge of the battery is low.

FIG. 3 graphically shows operation of a multi-mode powertrain system, e.g., as described with reference to FIG. 1, executing a deceleration fuel cutoff pumping loss reduction (DPLR) mode enablement process in response to a dFCO request, a DPLR mode request and a DPLR mode exit request. Monitored parameters include a dFCO request 302, fuel injector operation 304, an immediate engine torque request 306, an engine airflow torque (Te Air) 308, and a pump down exit torque 310, all of which are plotted in relation to time, which is shown on the horizontal axis.

During ongoing operation of the multi-mode powertrain system, a dFCO request 302 is initiated as shown at time 320, which is immediately followed by torque reduction through spark retardation and subsequent deactivation of the fuel injector operation 304, which is shown at time 322. At time 324, the immediate engine torque 306 requests DPLR mode, which activates at time 326, as indicated by an increase in intake manifold pressure and the engine airflow torque 308.

At time 328, there is a request to exit dFCO. Because the DPLR mode had been active, execution of the pump down mode is necessary, which is indicated by the drop in the immediate engine torque request 306 from DPLR level to its minimum torque value. The engine initiates intake manifold pump down by closing the throttle, with a corresponding decrease in the engine airflow torque 308.

At time 330, the decreasing engine airflow torque 308 meets the pump down exit torque 310, and as a result engine refueling is initiated, indicated by deactivation of the dFCO request 302 with a corresponding engine torque request 306. As a result, fuel injectors are activated 304 and at time 332 all injectors have been refueled. In this manner, the multi-mode powertrain system can activate and deactivate operation in the dFCO state and in the DPLR mode of the dFCO state.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a multi-mode powertrain system including a transmission configured to transfer torque among an internal combustion engine, torque machines and an output member, the method comprising:
   executing a deceleration fuel cutoff state, the executing comprising:
      stopping fuel flow to the engine; and
      operating a deceleration fuel cutoff state pumping loss reduction mode comprising opening an air throttle to a fully open position to reduce engine pumping losses during the deceleration fuel cutoff state;
   exiting the deceleration fuel cutoff state, the exiting comprising, prior to restoring the fuel flow to the engine, operating an engine intake manifold pump down mode comprising closing the air throttle to reduce an air intake manifold pressure and reduce an engine torque realized upon engagement of the engine once the fuel flow is restored.

2. The method of claim 1, further comprising controlling one of the torque machines to spin the engine.

3. The method of claim 1, wherein operating the engine intake manifold pump down mode is performed selectively based upon programmed pump down mode abort logic.

4. The method of claim 3, wherein the programmed pump down mode abort logic disallows the pump down mode based upon a factor comprising one of exceeding an operator torque request, exceeding a battery power limit, exceeding a battery discharge limit, and exceeding a torque capacity of one of the torque machines.

5. The method of claim 1, further comprising restoring the fuel flow to the engine after completion of the pump down mode.

6. A method for controlling a multi-mode powertrain system including a transmission configured to transfer torque among an internal combustion engine, torque machines and an output member, the method comprising:
  executing a deceleration fuel cutoff state, the executing comprising:
    stopping fuel flow to the engine; and
    operating a deceleration fuel cutoff state pumping loss reduction mode comprising opening an air throttle to a fully open position to reduce engine pumping losses during the deceleration fuel cutoff state;
  exiting the deceleration fuel cutoff state, the exiting comprising, prior to restoring the fuel flow to the engine, selectively operating an engine intake manifold pump down mode comprising closing the air throttle to reduce an air intake manifold pressure and reduce an engine torque realized upon engagement of the engine once the fuel flow is restored, the selective operation being provided by programmed pump down mode abort logic; and
  restoring the fuel flow to the engine.

7. The method of claim 6, wherein operating the intake manifold pump down comprises closing an engine throttle and controlling one of the torque machines to spin the engine.

8. The method of claim 6, wherein restoring the fuel flow to the engine is initiated when an engine airflow torque achieves a torque value defined by an accelerator torque request.

9. The method of claim 8, wherein the accelerator torque request is determined based upon an operator input to an accelerator pedal.

10. The method of claim 6, wherein restoring the fuel flow to the engine is initiated when an engine airflow torque achieves a target engine torque.

11. The method of claim 6, further comprising aborting the intake manifold pump down mode and initiating refueling when system constraints rendering the pump down mode acceptable are violated during the intake manifold pump down mode.

12. The method of claim 11, wherein violating system constraints during the intake manifold pump down mode comprises exceeding an output torque request.

13. The method of claim 11, wherein violating system constraints during the intake manifold pump down mode comprises exceeding a battery power limit.

14. The method of claim 11, wherein violating system constraints during the intake manifold pump down mode comprises exceeding a battery discharge limit.

15. The method of claim 11, wherein violating system constraints during the intake manifold pump down mode comprises exceeding a torque capacity of one of the torque machines.

* * * * *